May 4, 1948.    G. H. AKLIN    2,441,093
TELEPHOTO LENSES
Filed July 22, 1946

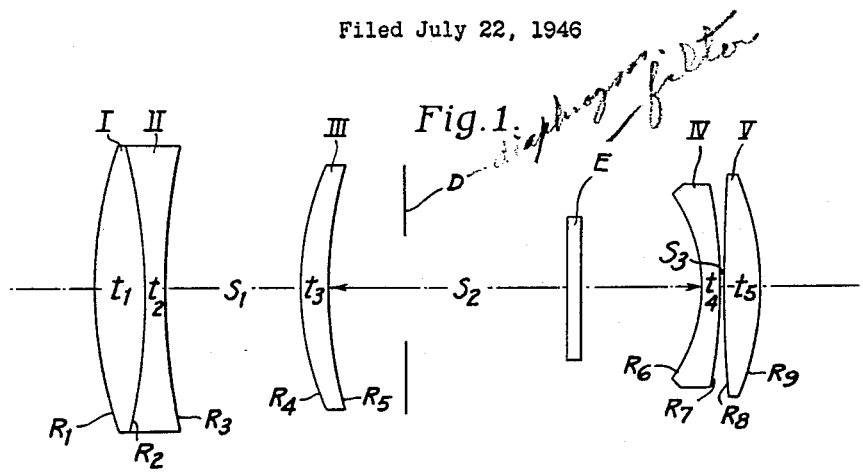

Fig. 1.

| EF = 100 mm. | | | | f/6.0 |
|---|---|---|---|---|
| LENS | $N_D$ | V | RADII | THICKNESSES |
| I | 1.572 | 57.4 | $R_1 = +29.8$ mm. | $t_1 = 3.40$ mm. |
| II | 1.617 | 38.5 | $R_2 = -34.8$ | $t_2 = .9$ |
|  |  |  | $R_3 = +61.3$ | $S_1 = 8.77$ |
| III | 1.620 | 60.3 | $R_4 = +17.7$ | $t_3 = 1.67$ |
|  |  |  | $R_5 = +23.6$ | $S_2 = 26.97$ |
| IV | 1.755 | 47.2 | $R_6 = -11.2$ | $t_4 = .98$ |
|  |  |  | $R_7 = -65.9$ | $S_3 = .05$ |
| V | 1.575 | 41.4 | $R_8 = +180.8$ | $t_5 = 2.46$ |
|  |  |  | $R_9 = -17.6$ | BF = 38.3 |

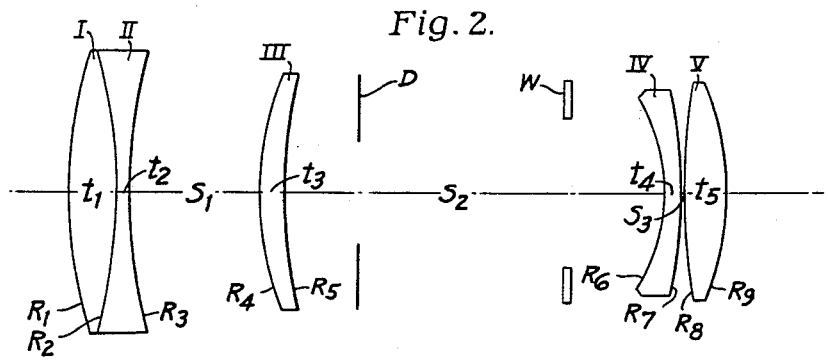

Fig. 2.

| EF = 100 mm. | | | | f/6.3 |
|---|---|---|---|---|
| LENS | $N_D$ | V | RADII | THICKNESSES |
| I | 1.572 | 57.4 | $R_1 = +29.8$ mm. | $t_1 = 3.39$ mm. |
| II | 1.617 | 38.5 | $R_2 = -34.8$ | $t_2 = .98$ |
|  |  |  | $R_3 = +61.3$ | $S_1 = 8.76$ |
| III | 1.620 | 60.3 | $R_4 = +17.7$ | $t_3 = 1.67$ |
|  |  |  | $R_5 = +23.6$ | $S_2 = 26.75$ |
| IV | 1.755 | 47.2 | $R_6 = -11.2$ | $t_4 = .98$ |
|  |  |  | $R_7 = -64.9$ | $S_3 = .05$ |
| V | 1.575 | 41.4 | $R_8 = +190.9$ | $t_5 = 2.46$ |
|  |  |  | $R_9 = -17.6$ | BF = 38.28 |

George H. Aklin
INVENTOR

BY
ATT'Y & AG'T

Patented May 4, 1948

2,441,093

UNITED STATES PATENT OFFICE 2,441,093

TELEPHOTO LENS

George H. Aklin, Rochester, N. Y., assignor to Eastman Kodak Company, Rochester, N. Y., a corporation of New Jersey Application July 22, 1946, Serial No. 685,356

5 Claims. (Cl. 88—57)

This invention relates to telephoto lenses.

The object of the present invention is to provide a distortion-corrected telephoto objective broadly of the type shown in my Patent No. 2,378,170, issued June 12, 1945, and with improved sharpness of the image, particularly at points near the edge of the field.

The objective shown in that patent comprises a front positive member and a rear negative member concave toward each other and spaced apart by between 0.2F and 0.4F, where F is the focal length of the objective. The positive member consists of two positive components convex toward the front separated by between 0.04F and 0.25F. The negative member consists of a negative meniscus element with index of refraction greater than 1.72 spaced in front of a positive element convex toward the rear.

According to the present invention, the airspace within the negative member is smaller than 0.003F and the dioptric powers of the two surfaces bounding this space are each positive and total between 1.2 and 1.6 times that of the objective as a whole.

In a preferred form of the objective shown in my prior patent, the positive member consists of a cemented doublet in front of a single positive element.

According to a preferred feature of the present invention, the refractive index of the single positive element is between 1.60 and 1.75 and the refractive index of the positive element of the negative member is between 1.54 and 1.59. The latter element thus has a lower index than heretofore, and I have discovered that this has a beneficial effect on the oblique spherical aberration. The single element (part of the positive member) is given a higher index to restore the Petzval sum at least partially and also to improve the zonal spherical aberration.

According to another preferred feature of the invention, the cemented surface of the front component is made more strongly curved; preferably its radius of curvature is between 0.3F and 0.36F. Correspondingly the front surface of the negative member is less strongly curved: preferably its radius of curvature is between 0.111F and 0.120F. The former surface thus has a stronger correcting effect upon the aberration and the latter surface, which is very sensitive to a small change, has a weaker effect. The net result is that the correction of marginal spherical aberration is maintained, and the zonal aberration is reduced. This feature thus cooperates with the other features of the invention to produce a lens capable of forming an extremely sharp image over a field of about 10° from the axis.

In the accompanying drawing Figs. 1 and 2 show objectives according to the invention and constructional data for the same.

The tables of data are repeated here for convenience:

Example 1, Fig. 1

EF=100 mm.    f/6.0

| Lens | $N_D$ | V | Radii | Thicknesses |
|---|---|---|---|---|
| I | 1.572 | 57.4 | $R_1=+29.8$ mm. | $t_1=3.40$ mm. |
| II | 1.617 | 38.5 | $R_2=-34.8$ | $t_2=0.98$ |
|  |  |  | $R_3=+61.3$ | $s_1=8.77$ |
| III | 1.620 | 60.3 | $R_4=+17.7$ | $t_3=1.67$ |
|  |  |  | $R_5=+23.6$ | $s_2=26.97$ |
| IV | 1.755 | 47.2 | $R_6=-11.2$ | $t_4=0.98$ |
|  |  |  | $R_7=-65.9$ | $s_3=0.05$ |
| V | 1.575 | 41.4 | $R_8=+180.8$ | $t_5=2.46$ |
|  |  |  | $R_9=-17.6$ | $BF=38.3$ |

Example 2, Fig. 2

EF=100 mm.    f/6.3

| Lens | $N_D$ | V | Radii | Thicknesses |
|---|---|---|---|---|
| I | 1.572 | 57.4 | $R_1=+29.8$ mm. | $t_1=3.39$ mm. |
| II | 1.617 | 38.5 | $R_2=-34.8$ | $t_2=0.98$ |
|  |  |  | $R_3=+61.3$ | $s_1=8.76$ |
| III | 1.620 | 60.3 | $R_4=+17.7$ | $t_3=1.67$ |
|  |  |  | $R_5=+23.6$ | $s_2=26.75$ |
| IV | 1.755 | 47.2 | $R_6=-11.2$ | $t_4=.98$ |
|  |  |  | $R_7=-64.9$ | $s_3=.05$ |
| V | 1.575 | 41.4 | $R_8=+190.9$ | $t_5=2.46$ |
|  |  |  | $R_9=-17.6$ | $BF=38.28$ |

These objectives are particularly suited to being made up in a very long focal length for use in high altitude aerial mapping and reconnaissance. They differ only in that Example 1 has some slightly different radii and a slightly longer central airspace to compensate for the 0.6 mm. thickness of the filter E inserted therein. The diameter of this filter and likewise that of the fixed aperture or window W in Fig. 2 may be so chosen as to cut off the extreme rim rays at the extreme field angle and thus to improve the sharpness of the image in known manner. The customary variable diaphragm D, also shown in the second airspace, may be placed at any convenient distance up to about 0.15F behind the positive member.

It is obvious from the above tables that both of these objectives embody all the features of the invention, and that both are broadly of the type described in my earlier patent. Also, both embody some features of Patent No. 2,321,973 Bennett and 2,382,669 Schade.

The objectives shown have a total length (measured from the front vertex to the focal plane) of about 0.83F, and thus have a moderately strong telephoto effect. For lenses of this type I prefer the refractive indices N, spacings $s$, and radii of curvature R to be within the limits set forth in the following table:

| | |
|---|---|
| $1.54 < N_1 < 1.75$ | $0.25F < R_1 < 0.35F$ |
| $1.025 N_1 < N_2 < 1.12 N_1$ | $0.30F < -R_2 < 0.36F$ |
| $0.04F < s_1 < 0.25F$ | $0.60F < R_3 < 0.68F$ |
| $1.60 < N_3 < 1.75$ | $0.15F < R_4 < 0.20F$ |
| $0.2F < s_2 < 0.4F$ | $1.2 R_4 < R_5 < 1.5 R_4$ |
| $1.72 < N_4 < 1.85$ | $0.111F < -R_6 < 0.125F$ |
| $0.00 < s_3 < 0.003F$ | $-5 R_6 < -R_7 < -8 R_6$ |
| $1.54 < N_5 < 1.59$ | $\frac{1.2}{F} < \left( \frac{N_4-1}{-R_7} + \frac{N_5-1}{R_8} \right) < \frac{1.6}{F}$ |
| | $0.14F < -R_8 < .24F$ |

Also, when the lens is made up in a very long focal length, it is advantageous to make the edge thickness of the positive elements and the center thickness of the negative elements less than about 0.02F.

What I claim is:

1. A telephoto objective comprising a front positive member and a rear negative member concave toward each other and spaced apart by between 0.2F and 0.4F where F is the focal length of the objective, the positive member consisting of a positive cemented doublet and a positive single element spaced therebehind by more than 0.04F and less than 0.25F, the negative member consisting of a negative meniscus element whose refractive index is between 1.72 and 1.85 spaced in front of a positive element whose rear surface is convex, and the objective being characterized by the air space within the rear negative member being less than 0.003F and greater than zero and by the dioptric powers of the surfaces bounding this space totaling between 1.2 and 1.6 times that of the objective as a whole.

2. A telephoto objective according to claim 1 further characterized by the single positive element of the front member having a refractive index between 1.60 and 1.75 and by the single positive element of the rear member having a refractive index between 1.54 and 1.59.

3. A telephoto objective according to claim 1 further characterized by the cemented surface of the front doublet being concave to the front and having a radius of curvature between 0.30 and 0.36F and by the front surface of the negative member having a radius of curvature between 0.111F and 0.120F.

4. A telephoto objective comprising a cemented doublet followed by three spaced single elements, in which the total length from the front vertex of the doublet to the focal plane of the objective is between 0.78F and 0.88F, where F is the focal length of the objective, in which the following algebraic relations hold:

| | |
|---|---|
| $1.54 < N_1 < 1.75$ | $0.25F < R_1 < 0.35F$ |
| $1.025 N_1 < N_2 < 1.12 N_1$ | $0.30F < -R_2 < 0.36F$ |
| $0.04F < s_1 < 0.25F$ | $0.60F < R_3 < 0.68F$ |
| $1.60 < N_3 < 1.75$ | $0.15F < R_4 < 0.20F$ |
| $0.2F < s_2 < 0.4F$ | $1.2 R_4 < R_5 < 1.5 R_4$ |
| $1.72 < N_4 < 1.85$ | $0.111F < -R_6 < 0.125F$ |
| $0.00 < s_3 < 0.003F$ | $-5 R_6 < -R_7 < -8 R_6$ |
| $1.54 < N_5 < 1.59$ | $\frac{1.2}{F} < \left( \frac{N_4-1}{-R_7} + \frac{N_5-1}{R_8} \right) < \frac{1.6}{F}$ |
| | $0.14F < -R_8 < .24F$ | where N, $s$ and R denote respectively the refractive indices for the D line of the spectrum, the spaces between the components, and the radii of curvature, each numbered by subscripts in order from front to rear, and in which a negative radius of curvature R denotes a surface concave toward the front.

5. An objective according to claim 4 in which the axial thickness of each negative component and likewise the edge thickness of each positive component is less than 0.02F.

GEORGE H. AKLIN.

REFERENCES CITED

The following references are of record in the file of this patent:

UNITED STATES PATENTS

| Number | Name | Date |
|---|---|---|
| 2,321,973 | Bennett | June 15, 1943 |
| 2,378,170 | Aklin | June 12, 1945 |
| 2,382,669 | Schade | Aug. 14, 1945 |

FOREIGN PATENTS

| Number | Country | Date |
|---|---|---|
| 222,709 | Great Britain | Oct. 9, 1924 |